Dec. 18, 1928.
G. G. SMITH
1,695,669
SYSTEM AND APPARATUS FOR SEWAGE
Filed March 24, 1925    2 Sheets-Sheet 1
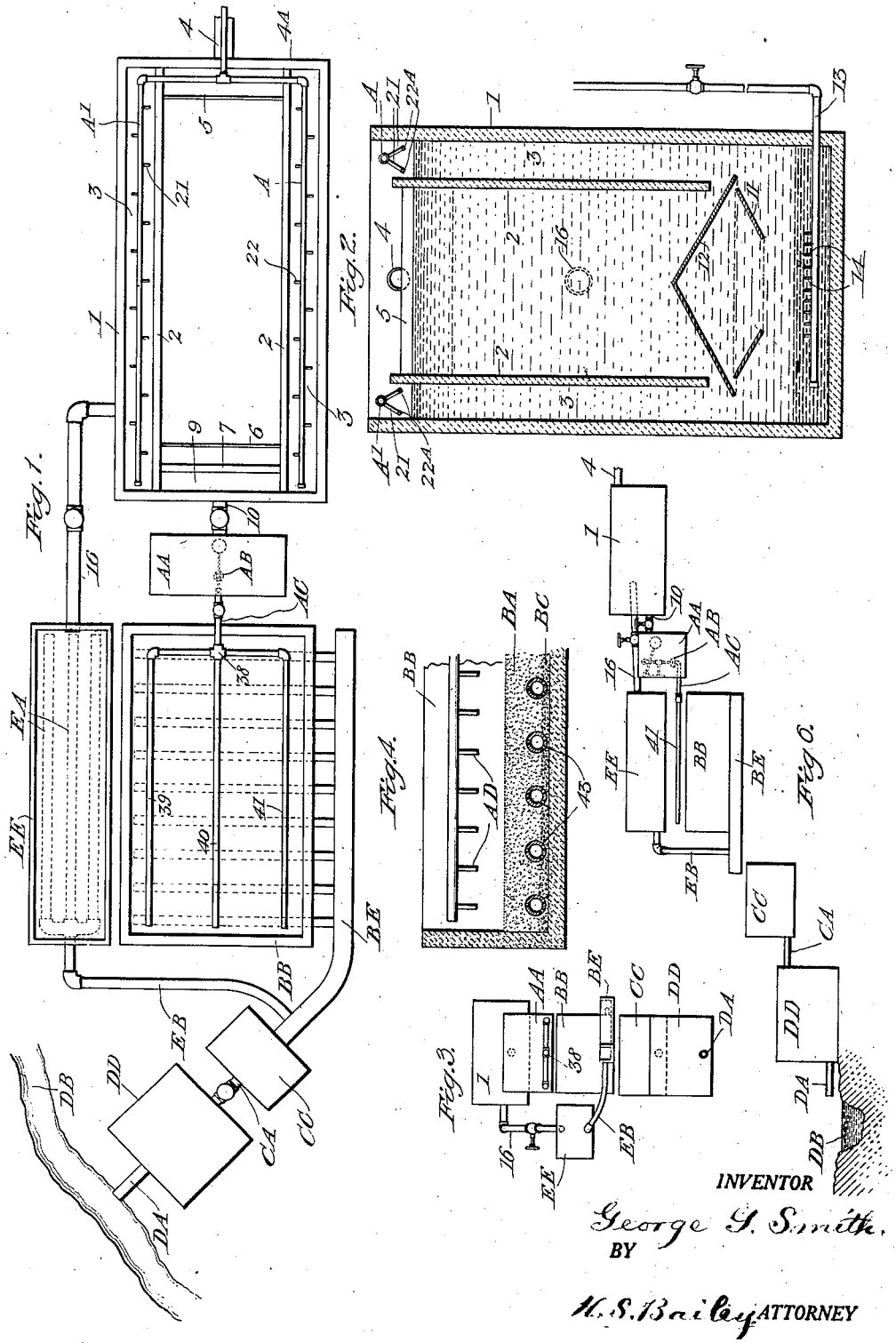
INVENTOR
George G. Smith,
BY
H. S. Bailey ATTORNEY

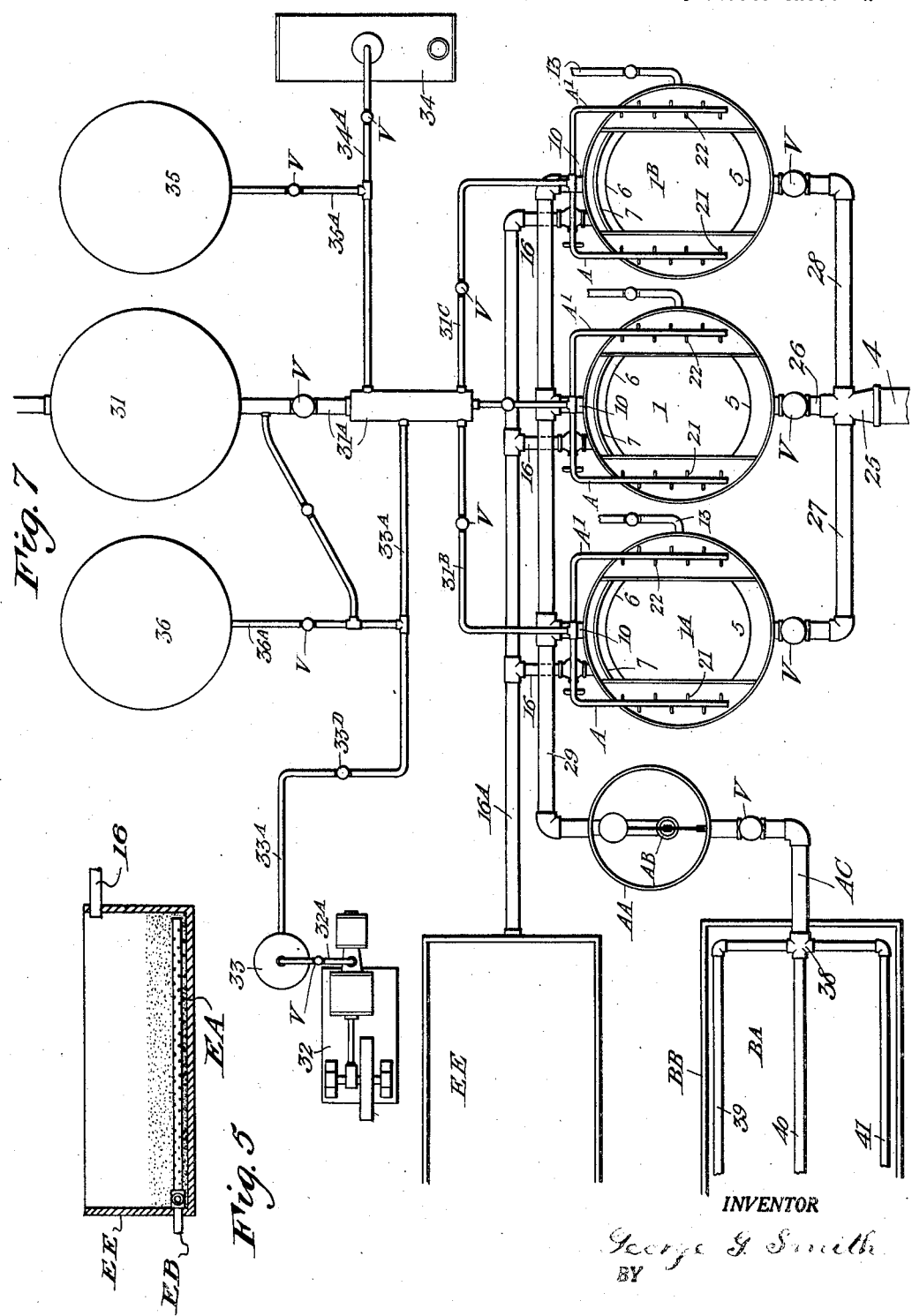

Patented Dec. 18, 1928.

1,695,669

UNITED STATES PATENT OFFICE.

GEORGE G. SMITH, OF LITTLETON, COLORADO.

SYSTEM AND APPARATUS FOR SEWAGE.

Application filed March 24, 1925. Serial No. 18,028.

My invention relates to a new method and system and apparatus for treating city and town sewage to eliminate from it its objectionable gaseous odors and to purify its water.

And the objects of my invention are:

First: To provide means for preventing the escape from sewage of the unsanitary smelling odors and gases that are natural to it into the atmosphere, to be carried by winds over the city or town where the sewage receiving, separating and filtering plant is located.

Second: To provide a method and system and an apparatus that receives the sewage from the sewage pipes system of a city or town and so treats it that the bad smelling and unsanitary gases are prevented from forming and rising through it and flowing from it into the atmosphere.

Third: To provide a method and system and an apparatus for settling the scud or scum that rises to the surface of the sewage in the sewage receiving, settling and water purifying receptacle, which may be a tank or series of tanks of any suitable shape, or a chamber or series of chambers, or a long trough or flume, or any other kind of sewage containing members that will receive, settle, filter and purify the water and the gas that rises through the water from the sewage.

My invention contemplates broadly, in order to separate the water from the heavy particles of matter in the sewage, the means for the use of either compressed air, or steam, or water, or a combination of these, and also the use of a chemical solution or solutions, or a combination of chemical solutions and water, when necessary, to destroy the germs of malignant diseases that may appear in the sewage at times when a city or town is visited by a malignant disease that spreads among its citizens, and that also act to purify the water of the sewage, such as alum and any other chemical or chemicals that are known to effect these results. Furthermore, my invention contemplates broadly the application to the sewage of any suitable pulverulent, or powdered or granulated material commingled with and forced by air, steam or water, or a combination of these against the surface of the scud or scum or against the surface of the water, and against all characters of bacteria and matter rising in the water to its surface, and also of discharging it into the sewage water underneath its surface, either with or without the above mentioned chemical solution, or with or without a pulverulent material, that will drive down, settle and force every germ of bacillus organism and putrefaction matter or material that develops or tends to develop malignant diseases to the bottom of the sewage receiving receptacle or receptacles that receive all of the sewage of the net work of sewage receiving and conveying pipes of a city or town, and that will purify the water thereof so that it is fit to drink and the gases arising from the water and flowing into the atmosphere are as fit to breathe as the atmosphere itself and as free from obnoxious odors.

The form of settling tank used in this system is shown and described more fully in my Patent 1,602,052, dated October 19, 1926, entitled "Sewage disposal plant".

The description and the illustrations of my gas and water purifying plant are as follows, reference being had to the accompanying drawings in which:

Fig. 1 shows a complete system of tanks.

Fig. 2 is a sectional view of the settling tank of Fig. 1.

Fig. 3 is an end elevation showing the relative position of the tanks of Fig. 1.

Fig. 4 is a partial section of one tank of Fig. 1.

Fig. 5 is a partial section of another of the tanks shown in Fig. 1.

Fig. 6 is a side elevation of Fig. 1.

Fig. 7 shows a modified system of tanks.

In sanitary sewer tanks of the type shown in the accompanying drawings, the sewage flows continuously into the tank through an inlet pipe and the water rises to a level defined by a weir or dam over which it flows and passes off through an outlet pipe to a suitable filtering plant and thence to a stream or river.

In Figures 1 and 2 my rectangular shaped tank, which I have numbered 1 is provided with the partitions 2 positioned at a distance from its opposite sides the same as in the figures of my round tank. It is also provided with a sewage inlet pipe 4, that is illustrated entering the end 4$^A$ of the tank, and it is also provided with baffle plates 5 and 6, and it is also provided with the water discharging pipes 10 which discharge the water into a flushing tank AA, the action and use of which will be presently described.

This rectangular tank is also provided with a clear water inlet pipe 13 that enters its bottom portion and extends along its bottom and is provided with short upward projecting water outlet pipes 14, that are arranged to discharge clear water up into the bottom of the funnel 11, and into the hood 12 both of which are also used in this rectangular tank.

This rectangular tank is also provided with a flushing out pipe 16, which leads to a filter BB, as will be presently described. I have preferably illustrated the lower end of my rectangular tank square, but it can be tapered convergingly lengthwise to narrow its bottom end like my round tanks if desired.

The clear water feed line A and A¹ are used in this rectangular tank and they extend throughout the whole length of it over its two opposite gas beds 3, and water spraying pipes 21 are placed in its length close enough together to fully spray the entire surface of the tops of the gas beds with water under pressure, to drive the scud back down into the gas beds as fast as it rises to the surface. My invention, however, contemplates broadly any kind or character of a spraying system that will completely and perfectly drive the scud down into the sewage water in the gas chambers 3 that rises to the top of it.

The water from the sewage treating tank from which the obnoxious smelling gas has been eliminated, and which flows over the dam 7 into the space 9 and out of it through the valved pipe 10 flows into a flushing tank AA, which is provided with an automatically opening and closing float valve mechanism AB the valve portion of which is at the bottom of the tank, and when the tank is full the float opens the valve and allows the water to escape from the bottom of the tank into a pipe AC. The water is thus fed in measured quantities to the tank BB, since valve AB opens only when tank AA contains a predetermined quantity of water. Pipe AC conveys water to a group of pipes, three being shown, that are provided with numerous downwardly extending spraying nozzles AD that are placed at equal distances apart along the length of the pipes and they discharge the water into a filter tank BB which is provided with a filter bed that is preferably made of sand BA and gravel BC, and the spraying pipes extends over the whole length of the filter tank and discharge this water from the flushing tank in sprays on top of the filter bed of sand and gravel.

On the bottom of this filter tank BB, I place a number of perforated tile pipes 43, which extend through one side of the filter and connect to a trough BE, into which it discharges the water, and this trough BE extends to and discharges into a chemical treatment tank CC, in which it is filtered through a bed of chloride of lime and ammonia, and from the bottom of this chemical tank the water runs through a pipe CA into the top of a retaining tank DD from the bottom of which it runs through a pipe DA into a river DB or other body of water, or it can be used for irrigation. The float valve and the spraying pipes are more fully described in detail hereinafter.

The solid sewage material, which is called scud, that settles in the bottom of the sewage treating tank has to be flushed out of it from time to time and this scud material is washed out of either the single square or round tank or tanks by the clear water from the pipe 13, and it flows out of a single tank, or out of all the tanks in the group of three tanks through the valved pipe 16, into a tank EE which I call a scud-tank, and it is provided with a filter bed which preferably consists of sand and gravel, the same as the filter bed in the filter tank BB, and this scud filtering tank EE is also provided along its bottom with perforated tiles EA, and the scud water filters through the filter bed into the tiles and runs from them into a pipe EB which extends from this scud tank EE to the trough BE, and the filtered water from this scud tank EE flows through the pipe EB into the trough BE and mingles with and flows with the water that flows through this trough from the tank BB, into and through the chemical filtering tank CC, and trough the retaining tank DD into the river.

I preferably illustrate in my present application a group of round tanks operatively connected to the several new features of my present invention, and I have arranged these round tanks so that one or more of them can be cut out and flushed out and cleaned out inside while the others are in operation, and this system will allow tanks to be added to the sewage system of a town or city as it grows in population.

In Figure 7, I illustrate a group of three tanks arranged and connected up in this manner, but, of course, any number of tanks can be connected together as shown, and I illustrate them connected up to the several different sewage settling, purifying and obnoxious gas eliminating and contagious disease and malignant germ destroying elements which I can use, each one of which is connected up to be used in each one or all of the tanks by itself or in combination with one or more of the others.

To illustrate, the objects of my present method, system and apparatus of my present invention I have provided a diagrammatical view of a multiple tank plant, and in this view the sewage pipe 4, that discharges the sewage from the sewage pipe system of a city into a group of tanks, is provided with a three branch nipple fitting 25, and the pipes 26, 27 and 28 are connected to these three nipples, the pipe 26 extends to and is inserted through the side of, and is secured to the tank 1, and the pipe 27 extends to and is inserted through and is secured to the side of the tank 1ᴬ, and the pipe 28, extends to and is inserted through and is secured to the side of the tank 1ᴮ, at any desired part of their height, and they discharge the sewage into them.

This group of three tanks are each, in internal construction, the same as the single tank illustrated in my Patent 1,602,052, above referred to.

The sewage water outlet pipe 10, of each of this group of tanks, is the same as in the tank shown in Figures 1, 2 and 3, except that the pipe 10 of each tank of this group of tanks is extended downward and is connected to a general pipe 29, that conveys this sewage water to the flushing tank AA and from it through a pipe AC and group of the flushing water spraying pipes into a filter BB from which it runs from a tank CC that is provided with chloride of lime and ammonia through which the water filters from the bottom of the tank CC into a retaining tank DD from which the water runs into the river EE.

The water spraying pipe apparatus and the use of water under pressure, which may be a city water supplying pressure or a gravity pressure from a large reservoir running into a supply tank 31, and from it through the cross pipes 31ᴮ, 31ᶜ and 31ᴰ into cross pipes B, from which the water flows into the water spraying pipes A and A¹, to which the spraying nozzles 21 are secured.

The water spraying pipes 21 are, however, shown positioned over the group of three tanks shown in Figure 3, but I have added to this group of tanks the apparatus that is necessary to supply water to either one or two, or all of the three tanks shown, at a time.

I have also added an air compressor 32 and an air receiving tank 33, their connecting pipe 33ᴬ, also a hot water and steam making boiler 34, and its connecting pipe 34ᴬ, and also a chemical solution holding tank 35, and its connecting pipe 35ᴬ, and also a pulverant material holding tank 36, which allows pulverant material of any suitable bacillicide destroying character, to be forced by compressed air either with or without water through the spraying nozzles 21 against the top of and into the sewage water in the tank.

All of the pipes that lead from these tanks 31, 32, 33, 34, 35 and 36, and leading to the sprinkling pipes A and A¹ are provided with valves V, by which the flow of their contents can be regulated, and valves V are also placed in the sewage pipes leading into the three tanks.

Consequently it can be plainly seen that either water alone or water mixed with air under pressure, which, in itself, will, if properly mixed under proper pressure, form a spray before it is discharged from the nozzles against the surface of any scud or scum or against any bacteria or against any contagious and malignant germs that rise up through the water to the top of its surface, may be beaten down into the water and forced to the bottom of either one or two or all three of the tanks, and at the same time provide an aerating and oxygenizing treatment to the sewage, in addition to the plain water treatment and if desired, any suitable pulverant material may be drawn or sucked into the air pipe 33ᴬ, from the pipe 36ᴬ, of the pulverant material holding tank 36, and it will be forced into the water pipe 31ᴬ and will commingle with the water flowing through it, and under the combined water and air pressure the pulverant material will filter down through the rising bacillus organisms and contacting with them will carry them down to the bottom of the tanks.

It is assumed, however, that the pulverant material will not be required except in extreme cases when, in addition to its purifying qualities it would act by direct contact with the bacillus and by its weight and the downward forcible movement imparted to it by the air and water under pressure, or the water pressure alone, or the air pressure alone, to drive all of the bacteria and other putrefaction matter that develops and spreads malignant or zymotic diseases to the bottom of the tank and destroy them; and in addition to or when it is necessary and more desirable in place of this combined air and water and pulverant material treatment, I have provided that in cases where there is present in sewage virulent poisonous germs of some deadly pestilence in a city, that either continuous or intermittent treatments of either cold or hot bacillicide chemical solutions treatment can be applied to it that will blot out all of the malignant germs in it and also all of the elements that are in it that create them.

My method and system and apparatus for treating sewage to destroy the bacillus and purify the water therein of its obnoxious and malignant gases is not complete, however, without a description of my new method of also destroying the bacillus and contagious germs left in the solid material and not fully destroyed, and that settles in the bottom of each tank and that is flushed out whenever it accumulates to a point in the tank of taking up too much room therein.

In carrying out this feature of my invention, I contemplate the use of all methods and apparatus that will accomplish the purpose of continuing the elimination of all health impairing and obnoxious and malignant odors from this solid portion of sewage.

I preferably, however, employ a round tank AA, preferably about 7 feet high by 9 feet in diameter, which I term a pressure or flushing tank, as the first element in the filtering apparatus I use, and place it enough below the water outlet pipes 10 and 29 of the water that overflows from each tank, to flow into it, and I connect to the end of this pipe 29, an automatically operating float valve AB, which when this tank is full raises this float valve and allows the water therein to flow out of it through a pipe AC that has a cross fitting 38 at its end from which three perforated pipes 39, 40 and 41 extend over the top of a filter bed BA, that is formed in a long rectangular shaped tank BB, in the bottom of which I place several rows of perforated tile piping 43, a full description of which will be found above. The three pipes 39, 40 and 41 are provided with depending nipples spraying nozzles AD from which the water is distributed over the top of the sand bed 43, see Figure 4. About two feet of sand is placed in the filter tank on top of the perforated tile pipes 43, and the water is discharged from the three perforated pipes out of the holes in their bottom sides into the top of the sand and gravel and filters down through them into the perforated tile pipes 43 on the bottom of the filter tank as described above.

The sewage material that settles in the bottom of a sewage treating tank has had all of the malignant germs of all kinds in it killed by the bacillicide solutions that have been fed to it through my chemical solution applying apparatus, consequently when it is flushed out of any one or all three of the sewage treatment tanks shown in Figure 7 by the admission of a large volume of water through the water inlet pipes 13, it is conveyed through a valve controlled pipe 16 that projects from all these tanks and the valve controlled pipes 16 are connected to a line pipe 16$^A$, which extends to the scud tanks EE, the construction and arrangement of which is described above and from which the water filtered from it flows into and through the trough BE, into the tank CC that is supplied with chloride of lime and ammonia, and flows with it into the large retaining tank, and from it into the river.

The solid material which accumulates on top of the long combined sewage material and flush water filter tank is removed from it from time to time before it gets too thick to retard the rapid filtering of the water out of its solid material, and this removed material can be either used for a fertilizer or it can be burned, or it can be buried.

The operation is as follows:

The sewage that enters the group of tanks, three of which tanks are shown in Fig. 7, from the three branches of the main sewage discharging pipe 4, passes through the tanks and receives the same scud and scum settling water pressure spraying treatment as in the single tanks shown in Figures 1, 2 and 3, and in addition each of the three tanks in Figure 7, can be given either singly or collectively as a group the additional hot or cold chemical treatment, or the air treatment, or the air and pulverant treatment, or to any combination of these that is thought best to meet any contagious and malignant disease germs that may be present in the sewage, consequently my present method, system and apparatus will positively so purify sewage that the unsanitary and obnoxious gases that come from it and carry diesase germs over towns and cities are totally destroyed and prevented from reproduction.

When any kind of a purifying and settling pulverant material is used, the valve V, in the pipe 36$^A$, is opened and the fine dry granulated material which may be of any sewage purifying and settling character will feed into the air pipe 33$^A$, as it will be assisted by the drawing suction action of the air which is also turned on by opening the valve V in the air pipe 33$^A$ which admits the combined air and pulverant material into the water pipe 31$^A$, and the three are commingled together and flow to the spraying nozzles 21 of the group of tanks, and a special set of spraying nozzles may be used in case the water nozzles are not large enough that will have their discharging apertures made of a size that will allow the pulverant material and the air and water to flow freely through them and strike forceably against the surface of any scud or bacteria that rises to the surface of the sewage and penetrates down into the sewage water and as it settles engage any carry the bacillus matter and germs down to the bottom of the tank with them.

It is understood, however, that the chemical treatments either hot or cold will be the most effective in destroying malignant disease and contagious germs but it will be much more expensive to use and in some cases may not be needed. In the case however, it is needed, any germ killing chemical solution or combination of germ killing chemicals may be made into a solution and placed in the chemical solution tank 35 then after the air valve 33$^D$ and the valve V in the pulverant material conveying pipe 36$^A$ are closed, and then if a cold chemical solution is wanted the valve in the pipe 35$^A$ is opened and the valve in the steam pipe 34$^A$ is closed, then the solution flows through the pipe 35$^B$ into the water supply pipe 31$^A$, and through it into the spraying nozzles 21 and 22 in the tops of the group of tanks and is discharged under its own and the pressure of the plain water onto the top of and into the sewage water, or if it is desired to use the chemical solution full strength the plain water can be cut off by closing the valve V in the pipe 31$^A$ that conveys the plain water from the water supply tank 31 into the water supply pipe 31$^A$, but in case a hot chemical solution is desired, the valve V in the chemical solution tanks discharge pipe 35$^A$ is still left open and in addition the valve V in the pipe 34$^A$ is opened, and then the hot water and steam from the boiler 34 flows through the pipes $34^A$ and $35^B$ into the chemical solution flowing into the pipe $35^B$ through the pipe $35^A$ from the chemical tank 35 and the hot water and steam heat the cold solution hot and it flows into the water pipe $31^A$ through the pipe $34^B$ and through the water pipe $31^A$ into the pipes $31^B$ and $31^C$ and through them into the spray nozzle supporting pipes A and $A^1$, and from them into and through the spray pipes 21 and 22 in continuous streams against the surface of the sewage water in the gas chambers 3 and it penetrates into it and mixes with it, and thus when a bacillicide chemical solution is used in the chemical tank, it kills and destroys all bacillus germs in the sewage treating tanks.

When treating the sewage with a hot chemical solution the plain water can be wholly shut off or the amount of it flowing through the pipe $31^A$ regulated to give the desired strength of bacillus germ destroying chemical solution required.

The sewage water in the tanks from which the obnoxious gases have been eliminated flows from them through the pipes 10 the same as it does in the Figures 1, 2 and 3, and each of the three tanks in the group shown in Figure 7 is extended to and is connected to a general sewage water conveying pipe 29, which conveyor is shown in Figure 7, and which conveys it to the flushing or pressure tank AA from which it is shown connected in Figure 7 by the pipe AB to the filter BB, the arrangement of and operative action of both of which have been described in detail heretofore, and consequently in Figure 7 only the connections between the group of three sewage treating tanks and the flushing tank and the scud tanks are shown.

My present method, system and apparatus invention provides every element that is necessary to thoroughly purify the most unsanitary and the most dangerous sewage to the health of human beings that exists, and while I have illustrated and described the preferred construction and arrangement of the apparatus I preferably employ in its constructive and operative elements of its several operative features, I do not wish to be limited to them, as many changes might be made in them without departing from the spirit of my invention.

Having described my sewage purifying method, system and apparatus, what I claim as new and desire to secure by Letters Patent is:

1. In a sewage disposal system, in combination, a main tank for the reception for the sewage, means therein for settling the scud sewage to the bottom of said tank, a filter tank containing a filter bed, connecting means between said tanks for passing the liquid sewage from the reception tank to the filter tank, said means including a spray device for distributing the liquid sewage substantially uniformly over the filter bed, and a scud tank connected to the main tank for periodically receiving the scud from said main tank.

2. The structure as in claim 1, wherein the connecting means between the main tank and the filter tank includes means for intermittently feeding the sewage liquid in measured quantities.

3. The structure as in claim 1, wherein the main tank has connected thereto a pipe for flushing the scud collected therein to the scud tank.

4. The structure as in claim 1, wherein filtering means is provided in the scud tank.

In testimony whereof I affix my signature.

GEORGE G. SMITH.